United States Patent [19]

Sheets

[11] 3,921,911
[45] Nov. 25, 1975

[54] PROJECTABLE LAWN SPRINKLER

[76] Inventor: Kerney T. Sheets, P.O. Box 637, Duplessis, La. 70728

[22] Filed: Mar. 6, 1975

[21] Appl. No.: 555,956

[52] U.S. Cl. ............................................. 239/206
[51] Int. Cl.² ........................................... B05B 3/06
[58] Field of Search ........................... 239/203–206

[56] References Cited
UNITED STATES PATENTS

| | | | |
|---|---|---|---|
| 1,458,975 | 6/1923 | Clauson | 137/604 X |
| 2,013,849 | 9/1935 | Keys | 239/206 |
| 2,399,112 | 4/1946 | Glover | 239/205 |
| 2,573,687 | 11/1951 | Brock | 239/226 X |
| 2,580,629 | 1/1952 | Wenzel | 239/310 X |
| 2,954,934 | 10/1960 | Hatanaka | 239/231 |
| 2,979,271 | 4/1961 | Boyden | 239/236 |
| 3,104,822 | 9/1963 | Muschett | 239/206 |
| 3,391,868 | 7/1968 | Cooney | 239/232 |
| 3,637,139 | 1/1972 | Felix | 239/206 |
| 3,709,435 | 1/1973 | Sheets | 239/204 X |
| 3,727,842 | 4/1973 | Ertsgaard et al. | 239/232 |
| 3,733,030 | 5/1973 | Carstenson | 239/205 |
| 3,758,038 | 9/1973 | Ridgway | 239/206 |
| R23,646 | 4/1953 | Burdick | 239/206 |

Primary Examiner—John J. Love
Attorney, Agent, or Firm—David L. Ray

[57] ABSTRACT

A projectable lawn sprinkler which rises automatically from the ground when water pressure is applied thereto. The sprinkler includes a tubular casing sunken in the ground, a hollow cylinder which floats upward within the tubular casing when water pressure is supplied to the sprinkler, and a rotating nozzle attached to the top of the hollow cylinder.

13 Claims, 5 Drawing Figures

PROJECTABLE LAWN SPRINKLER

BACKGROUND OF THE INVENTION

The present invention relates to a sunken lawn sprinkler with rotating nozzles which are automatically projected or advanced to a position above the surrounding ground level when water pressure is supplied to the sprinkler. The advantages of a projectable lawn sprinkler include avoidance in a lawn of a permanently raised fixture which can cause accidents, which is unsightly and around which the grass must be edged or clipped by hand, and avoidance of damage to a sprinkler system by children playing with a permanent, elevated standpipe, or by accidently hitting such a standpipe with a lawn mower or car.

To realize such advantages many forms of projectable sprinklers have been proposed, both commercially and in the patent literature. U.S. Pat. Nos. 3,104,822; 2,611,644; and 2,013,849 disclose various types of complex projectable lawn sprinklers. However, the sprinklers disclosed in these patents are relatively complex and accordingly are relatively expensive to manufacture.

One difficulty encountered in making a commercially successful lawn sprinkler has been the complexity and number of parts required. Such sprinklers are costly to manufacture, difficult to assemble, repair, and service, and are unreliable in operation. In addition, prior art sprinklers have suffered from the inability to seal well, thus causing an unnecessarily large drop in pressure so that fewer projectable sprinklers than permanently raised sprinklers could be used on a supply line of given hydraulic capacity.

An additional problem encountered in prior art projectable lawn sprinklers was that to prevent the standpipe projected from the ground from rocking it was necessary to have the relatively movable parts fit one another quite closely and to have lengthy bearing surfaces, i.e., lands. On the other hand, when the parts fit closely, substantial friction develops and foreign matter tends to stick between the parts. This sometimes jammed the standpipe and at other times scored the parts so as to permit leakage to develop. Furthermore, the use of long lands required additional effort to raise the standpipe and made it more vulnerable to jamming.

Additional disadvantages of projectable lawn sprinklers were that they did not tend to assume and maintain the same predetermined substantially vertical position each time they were erected, that they did not erect to great heights because clearances and friction were multiplied when the movement of the standpipe from retracted to extended position became appreciable, and that grass would frequently grow over the top of the projectable lawn sprinkler and prevent the sprinkler from rising.

My U.S. Pat. No. 3,709,435 resolved many of the above-mentioned problems encountered in the prior art. However, when the sprinkler head is made from plastic or a similar lightweight material, the projectable cylinder will not sink into the ground because the total weight of the sprinkler head and the projectable cylinder are insufficient to increase the air pressure inside the projectable cylinder to a level sufficient to force water left in the sprinkler head out of the sprinkler nozzles. Thus the air inside the cylinder could not escape to the atmosphere. The present invention overcomes this disadvantage.

THE INVENTION

The lawn sprinkler of the present invention includes a projectable floating cylinder having a sprinkler attached to the top end thereof, a cylinder housing in which the projectable cylinder moves, and a water supply attached to the sprinkler. The invention will be more completely understood by referring to the drawings in which.

Figure 1:
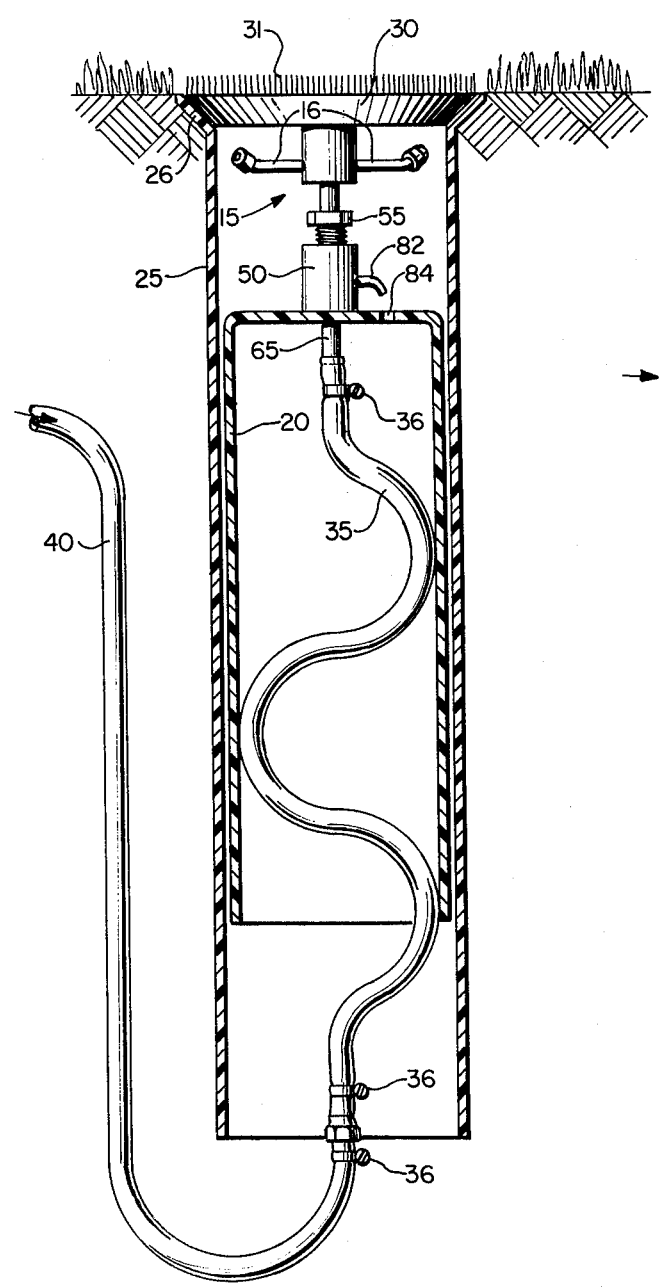
FIG. 1 is a partly sectional side view of the lawn sprinkler in the submerged position.
Figure 2:
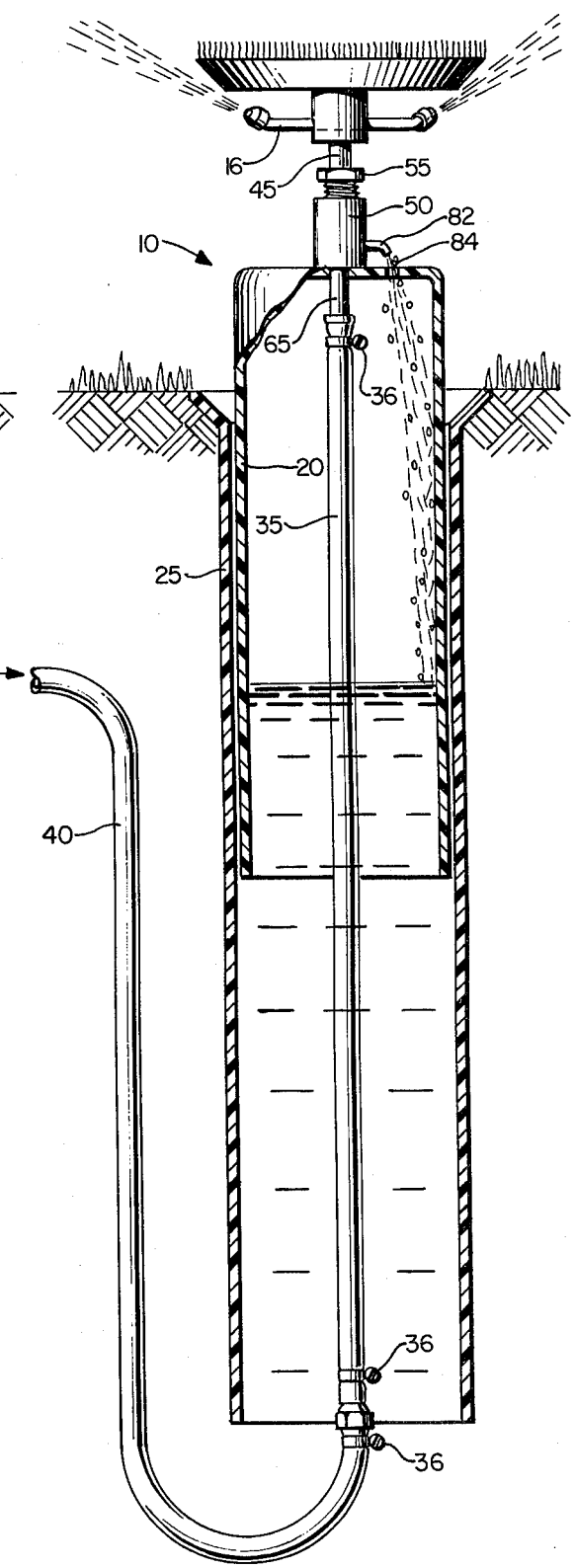
FIG. 2 is a partly sectional side view of the lawn sprinkler in the projected position.

Referring now to the drawings, and in particular FIGS. 1, 2, 3, and 5, the lawn sprinkler of the present invention can be seen to be contained in cylinder housing 25 which is sunken into the ground so that the lid 30 of cylinder housing 25 is at the surface of the ground. Located inside cylinder housing 25 is projectable cylinder 20 which floats upward within housing 25 when housing 25 fills with water, as shown in FIG. 2. Projectable housing 20 is connected to water supply 40 by means of flexible water hose 35. Flexible water hose 35 is attached to water supply 40 by means of clamp 36 and to lower stem 65 by means of another clamp 36. Water supply 40 may be a rigid pipe or flexible tubing, but hose 35 is preferable although a telescoping rigid pipe could be use.

Figure 5:
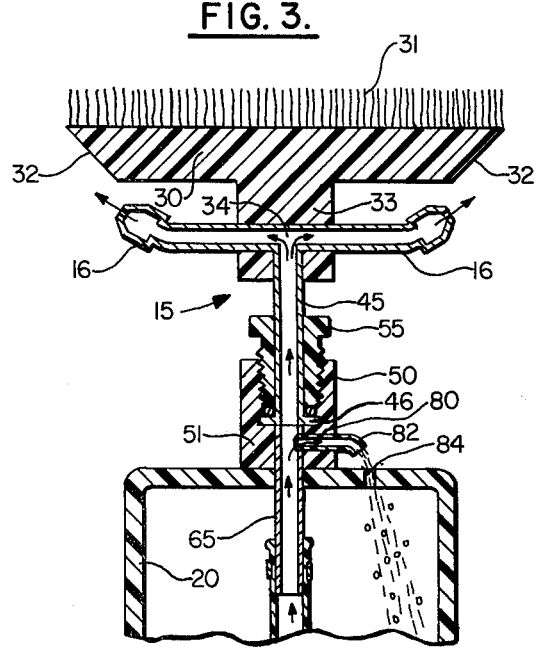
FIG. 5 is a partly sectional side view showing details of the rotating sprinkler nozzle.

Stem 65 can be seen in greater detail in FIG. 5. Stem 65 is a cylindrical pipe which has a lip 66 thereon which butts against flexible hose 35. Lower stem 65 projects through the top of cylinder 20, as seen in FIG. 5, and into the hollow base 51 of coupling 50.

Coupling 50 and lower stem 65 are rigidly attached to projectable cylinder 20 by any suitable means such as gluing, welding, screwing, etc. Immediately above lower stem 65 and in alignment therwith is rotating stem 45. Rotating stem 45 is a generally cylindrical pipe and has lip 46 on the lower end thereof which rests against coupling 50 to support rotating stem 45. When water pressure is supplied to the lawn sprinkler rotating stem 45 turns or rotates within coupling insert 55 thereby allowing sprinkler nozzle 16 to cover a wide circular area with water. Coupling insert 55 is generally cylindrical in shape and is preferably threadably connected to coupling 50, which is also generally cylindrical in shape. Coupling insert 55 may also be glued to coupling 50, or attached by any other suitable means.

Coupling 50 also has an opening 80 in the side thereof into which is fitted a conduit 82, thereby permitting water from inside coupling 50 to flow out through conduit 82. Conduit 82 is aligned with hole 84 in the top of projectable cylinder 20 so that water flowing from conduit 82 enters hole 84, thereby forcing water and some air into hole 84. The hole 84, of course, should be sufficiently small relative to the stream of water flowing from conduit 82 so that the hole 84 lies completely within the area upon which the water flowing from hole 84 impinges. For example, if the stream of water from conduit 82 were to be completely contained within hole 84 due to hole 84 being larger in diameter than the diameter of the stream of water flowing from conduit 82, then air inside cylinder 20 could escape upwardly out of hole 84 between the edges of hole 84 and the edge of the stream of water flowing from conduit 82 into hole 84, thus causing the cylinder 20 to sink downwardly or to remain in a sunken position.

Figure 4:
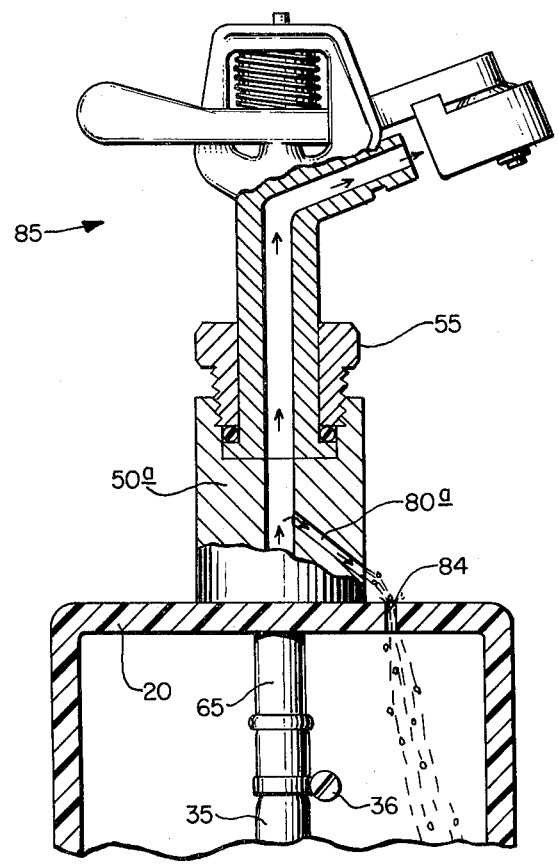
FIG. 4 is a side view of another embodiment of the lawn sprinkler in the submerged position.

In FIG. 4 is shown another embodiment of the present invention in which a opening or passageway 80a is substituted for the opening 80 and conduit 82 shown in FIG. 5. Opening 80a is aligned with hole 84 in the same manner as is conduit 82, i.e., so that water flowing from opening 80a enters hole 84, thereby forcing both air and water into hole 84. The size of opening 80a relative to the size of hole 84 should be the same as that previously described for conduit 82. Also shown in FIG. 4 is an impulse or impact sprinkler head generaly indicated by the numeral 85 which would operate in the same manner as the rotating head shown in the other drawings. Such sprinkler heads are well known in the art. For examples, see U.S. Pat. Nos. 3,309,025 and 3,391,868, which are hereby incorporated by reference.

Figure 3:
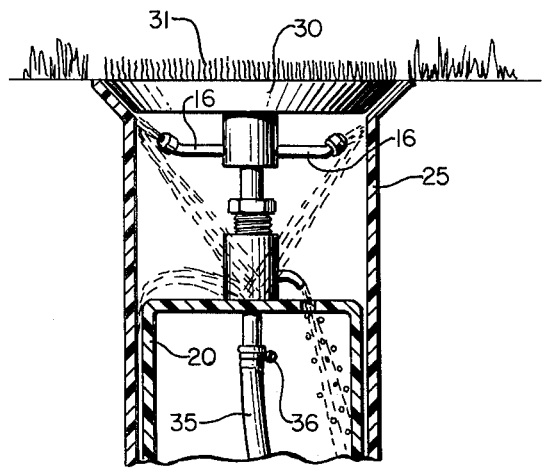
FIG. 3 is a partly sectional side view of the top portion of the lawn sprinkler in the submerged position indicating water flow.

The upper end of rotating stem 45 can be seen in FIG. 5 to be attached within hollow chamber 34 located in the base 33 of lid 30. The rotating stem 45 may be attached to lid 30 by any suitable means such as gluing, or the like. Also located in hollow chamber 34 of lid base 33 are two or more nozzles 16 which may be of any conventional configuration for spraying water. Lid 30 has simulated grass 31 located on the top thereof so that lid 30 will appear to be part of the grass on the ground surrounding the sprinkler. Lid 30 has beveled edges 32 which rest against beveled edge 26 of housing 25, as can be seen in FIG. 1 and FIG. 3, thereby enabling lid 30 to support a large amount of weight.

The operation of the sprinkler will now be described. Water enters water supply 40, as indicated by the arrow in FIG. 2. The water travels upward through housing 25 and out of conduit 82 in the embodiment of FIGS. 1–3 and 5, or out of opening 80a in the embodiment shown in FIG. 4. Cylindrical housing 25 begins to fill with water flowing from hole 84 and from nozzle 16. The water from nozzle 16 flows downward around the outside of projectable cylinder 20 and between the outside wall of projectable cylinder 20 and the inside wall of housing 25 until the sprinkler begins to float upward. As cylindrical housing 25 fills with water projectable cylinder 20 begins to float upwardly. The water from hole 84 continues to enter the interior of cylindrical housing 25 even after projectable cylinder 20 has risen to maximum height, thereby keeping projectable float 20 fully extended above the ground. If desired, a track may be located on the outside of cylinder 20 and a groove to contain the track may be located on the interior wall of housing 25 to prevent any possible turning of cylinder 20 in housing 25, assuming cylinder 20 is circular in cross-section. Other well known means may be used.

The maximum height to which cylinder 20 rises is limited by the length of flexible hose 35. Projectable cylinder 20 is kept from floating upward completely out of housing 25 by the downward force exerted on cylinder 20 by flexible hose 35 when flexible hose 35 is fully extended. When the water supply 40 is turned off, air in cylinder 20 flows out through hole 84. Thus, the air trapped within the interior of projectable cylinder 20 is allowed to escape to the outside and projectable cylinder 20 moves downward until the beveled edge 32 of lid 30 contacts the beveled edge 26 of cylinder housing 25. The water standing in cylindrical housing 25 then slowly seeps into the ground through the bottom of cylindrical housing 25. Sand may be placed around the bottom and sides of cylindrical housing 25 to allow water standing in housing 25 to be absorbed into the soil more rapidly.

The various components of both embodiments of the sprinkler of the present invention are preferably made from any suitable plastic material, or other materials such as various metals may also be used. Plastics are preferred because of lower weight, lower cost, and because plastics will not corrode. The various components of the sprinkler may be molded as one piece when such is feasible. For example, nozzles 16, stem 45, and lid 30, shown in FIG. 5, could be molded as one solid piece of plastic. In addition, coupling 50, lower stem 65, and housing 20 could be molded as a solid piece of plastic. Rotating stem 45 and coupling insert 55 in addition to nozzles 16 could be constructed of such materials as brass, aluminum, steel, and the like, although plastics are preferred. Very little wear in rotating stem 45 and coupling 55 is encountered because, as can be seen in FIG. 5, there is a slight clearance between the top of lip 46 on rotating stem 45 and the bottom of coupling 50 which allows a slight amount of water to flow upward between the outside of rotating stem 45 and the bottom or interior of coupling 50 to provide lubrication between rotating stem 45 and coupling insert 55.

One of the most important advantages of the present invention is the ability of projectable cylinder 20 to force lid 30 upward into grass which has grown over the top of the sprinkler. The buoyancy of the sprinkler, which is, of course, dependent on the diameter of projectable cylinder 20, provides several pounds of force to drive lid 30 upward through any grass which has grown over the top of the sprinkler. In addition, since nozzles 16 are spraying out water as lid 30 rises, the water sprayed therefrom blows any grass growing around the top of housing 25 backward. Therefore, not only will the sprinkler of the present invention rise upward through a thick layer of grass which has grown over the top of the sprinkler, the sprinkler will also push the grass away from the top of the sprinkler as it rises so that when the sprinkler sinks back into the ground grass will not fall down into housing 25 and prevent lid 30 from fitting flush against housing 25.

The terms "projectable cylinder", "cylindrical housing", "cylinder" and "cylindrical" are not meant to limit housing 25 and projectable cylinder 20 to a cylinder shape in the narrowest sense, i.e., tube having a cross-section which is a perfect circle. Housing 25 and projectable cylinder 20 includes cylindrical tubes having oval or irregualr cross-sections.

Having described the invention, it is desired that it be limited only within the spirit and scope of the following claims.

What is claimed is:
1. A projectable lawn sprinkler comprising:
  A. cylindrical housing means open at the top;
  B. projectable cylinder means having a top end and a bottom end located inside said housing,
    i. said projectable cylinder means having a cylindrical pipe means in the center thereof,
    ii. said projectable cylinder means having a hole therein located in the top end of said projectable cylinder means through which water and air may enter the interior of said projectable cylinder means;

C. water supply means connected to said cylindrical pipe means;

D. means connected to the top of said projectable cylinder means for spraying a stream of water through the atmosphere and onto said hole to force water into said hole; and E. nozzle means connected to said cylindrical pipe means for spraying water, said nozzle means being located above said top end of said projectable cylinder.

2. The lawn sprinkler of claim 1 wherein said projectable cylinder means is open at the bottom and hollow inside.

3. The lawn sprinkler of claim 1 wherein water supply means comprises a two-ended flexible hose connected at one end to a water pipe and at the other end to said cylindrical pipe means.

4. The lawn sprinkler of claim 1 wherein said means for spraying a stream of water onto said hole comprises conduit means.

5. The sprinkler of claim 4 wherein said nozzle means is connected to impulse sprinkler head means.

6. A projectable lawn sprinkler comprising:

A. a hollow cylindrical housing means having a top end and bottom end;
  i. said top end being open,
  ii. said housing means containing a water supply source at the bottom of said housing means;

B. a projectable cylinder means located in said cylindrical housing means,
  i. said projectable cylinder means having a top end and a bottom end,
  ii. said projectable cylinder means being open at the bottom end and hollow inside,
  iii. said projectable cylinder means having a cylindrical pipe means attached to the top end of said projectable cylinder;
  iv. said projectable cylindrical means having a hole therein located in the top end of said projectable cylinder means through which water and air may enter the interior of said projectable cylinder;

C. means connected to the top of projectable cylinder for spraying a stream of water through the atmosphere and onto said hole to force air and water into said hole, D. a two-ended flexible hose connected at one end to said water supply source and at the other end to said cylindrical pipe means, and E. nozzle means connected to said cylindrical pipe means, said nozzle means being located above said top end of said projectable cylinder means for spraying water.

7. The lawn sprinkler of claim 6 wherein said flexible hose is of sufficient length to prevent said projectable cylinder from floating completely upwards and out of said cylindrical housing.

8. The lawn sprinkler of claim 6 wherein said nozzle means are located below the top of said cylindrical housing when said projectable cylinder is in the submerged position.

9. The lawn sprinkler of claim 6 wherein said nozzle means has a lid attached to the top thereof.

10. The lawn sprinkler of claim 9 wherein said lid has a first lip which contacts a second lip located on the top end of said cylindrical housing when said projectable cylinder is in the submerged position.

11. The lawn sprinkler of claim 6 wherein said nozzle means comprises a rotating cylindrical pipe located above said cylindrical pipe having a hole therein, said rotating cylindrical pipe having nozzles attached to the upper end thereof.

12. The lawn sprinkler of claim 11 wherein said rotating cylindrical pipe has a lip on the lower end thereof which rests against coupling means attached to the top end of said projectable cylinder, said coupling means maintaining said rotating cylindrical pipe in alignment with said cylindrical pipe having a hole therein.

13. The lawn sprinkler of claim 6 wherein said nozzle means is connected to impulse sprinkler head means.

* * * * *